W. J. Lewis,
Making Bolts and Nuts,

No. 42,299. Patented Apr. 12, 1864.

Witnesses:
Josiah W. Ells.
Frank Ballou.

Inventor:
Wm J. Lewis

UNITED STATES PATENT OFFICE.

WILLIAM J. LEWIS, OF PITTSBURG, PENNSYLVANIA.

IMPROVEMENT IN CLAMPS FOR HOLDING NUTS AND BOLTS.

Specification forming part of Letters Patent No. 42,299, dated April 12, 1864.

*To all whom it may concern:*

Be it known that I, WILLIAM J. LEWIS, of the city of Pittsburg, in the county of Allegheny and State of Pennsylvania, have invented a new and useful improvement in Clamps for holding bolts and nuts during the process of cutting the screws thereof; and I hereby declare that the following is a full, clear, and exact description of its construction and operation, reference being had to the accompanying drawings, forming part of this specification, and to the letters of reference marked thereon, in which—

Figure 1:
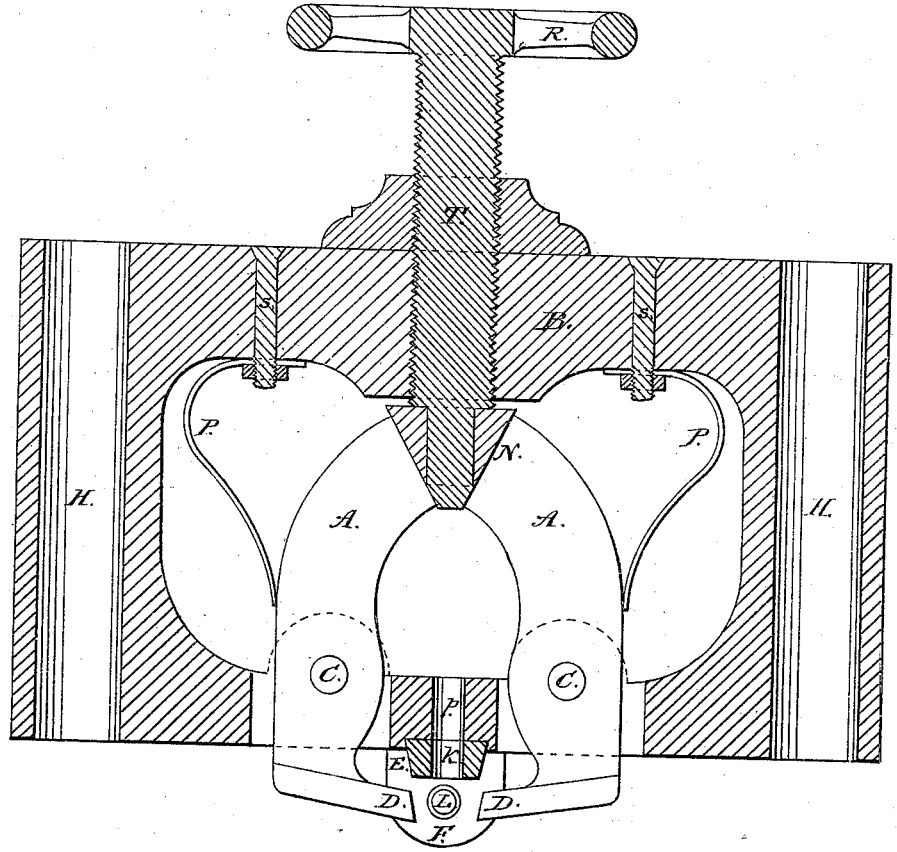
Figure 2:
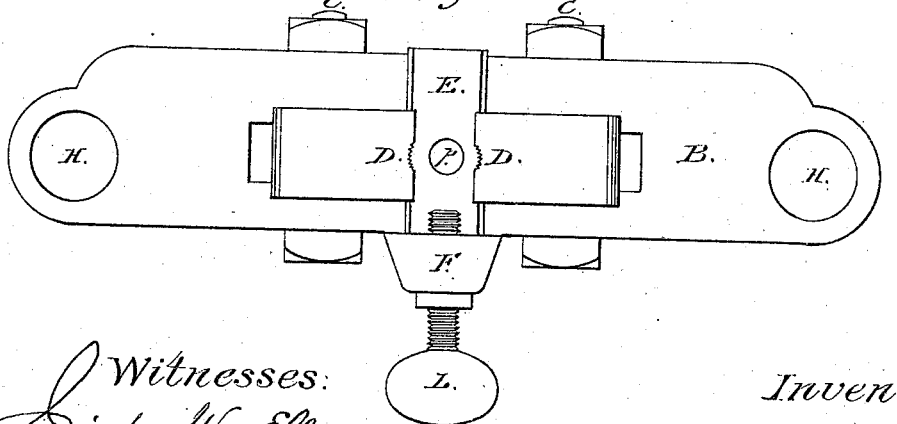

Figure 1 represents a transverse longitudinal section of my improved clamp, showing the various parts thereof. Fig. 2 represents a front view of the same.

All the drawings are lettered, and similar letters denote corresponding parts in the several views.

The object of my invention is to hold bolts and nuts while the operation of cutting the thread is going on, in such a manner as that the bolt or nut being operated on shall remain perfectly rigid during that process, so that, notwithstanding the hole in the nut may be out of line with its sides, the tap will enter and cut the screw so that the nut when finished will stand fair with the body of the bolt. To accomplish this I construct my apparatus by forming a metal frame, B, of the shape shown in the drawings, having holes H H through it for sliding on the rods for guiding it in its operation on the machine carrying the cutting-tools, whereby the center of the frame is always kept on a line with the center of the tool used. Projecting through the front of this frame B are a couple of short, strong levers, A A, secured in place and working in pivots C C passing vertically through them and the frame. The outer ends of these levers are furnished with the steel jaws D D, serrated or roughened on their face, the better to enable them to hold whatever may be placed between them. The inner or rear ends of these levers are curved so as to approach each other, and rest upon a conical wedge, N, which rotates on and is carried backward and forward by a stout screw, T, working through the back of the frame B, and is operated by a hand-wheel, R, on its extreme outer end. Pressing against each lever A is a stiff spring, P, secured to the inside of the frame B by a screw-bolt, s. The action of these springs is such that on the withdrawal of the conical wedge by the screw T the jaws D D are opened by reason of the springs pressing against the levers on the opposite side of the pivots C C. Just back of the jaws D D, and secured to the frame B, (by being dovetailed therein,) is a steel die, E, having a hole, k, through it for the passage of the tap, and corresponding with a hole, p, in the frame for a like purpose. Below this die, and projecting out from the frame beyond the face of the jaws D D, is a bracket, F, through which passes a thumb-screw, L, the object of which will be hereinafter explained.

The operation of my clamp is as follows: The frame B, is placed in position on the cutting-machine by passing the guide-rods thereof through the holes H H, when, by turning the hand-wheel R attached to the screw T, the conical wedge N will be released and drawn back. The springs P P will then force the levers A A toward each other, so as to open the jaws D D sufficiently wide to admit the head of a bolt or nut between them, which is held from dropping down by the thumb screw L. This thumbscrew also serves to adjust the head of the bolt or nut vertically, and bring the piece operated on directly on a line with the center of the hole K—in the die E. After this is done, the hand-wheel R is turned in a reverse direction, which causes the screw T to force the conical wedge N between the levers A A, causing the jaws D D to close on the nut, or whatever may be placed against the die E. The edges of these jaws have, in addition to their serrated or roughened face, an inclined pitch, being farthest separated at that part next the frame. This construction not only enables the jaws to bite the nut on its sides, but tends to draw the same back against the die. The operation of catching and releasing the nuts by this clamp, is very simple, yet, owing to its peculiar construction, it holds the work with a firmness unequaled by any machine for the same purpose heretofore in use.

Having thus described my improved clamp, what I claim is—

1. The levers A A, furnished with jaws D D for gripping the work, when operated by a wedge, N, and screw T, in combination with the die E and frame B for supporting the parts, the whole being constructed and arranged in the manner shown, and for the purposes herein set forth.

2. Combining with the frame carrying the jaws the thumb-screw L, supported by the projecting bracket F, operating in the manner as herein set forth.

3. The use of the springs P P for forcing the levers against the wedge, in combination with the frame B, the jaws D D, and die E, for the purposes hereinbefore shown and set forth.

WM. J. LEWIS.

Witnesses:
JOSIAH W. ELLS,
FRANK BALLOU.